UNITED STATES PATENT OFFICE.

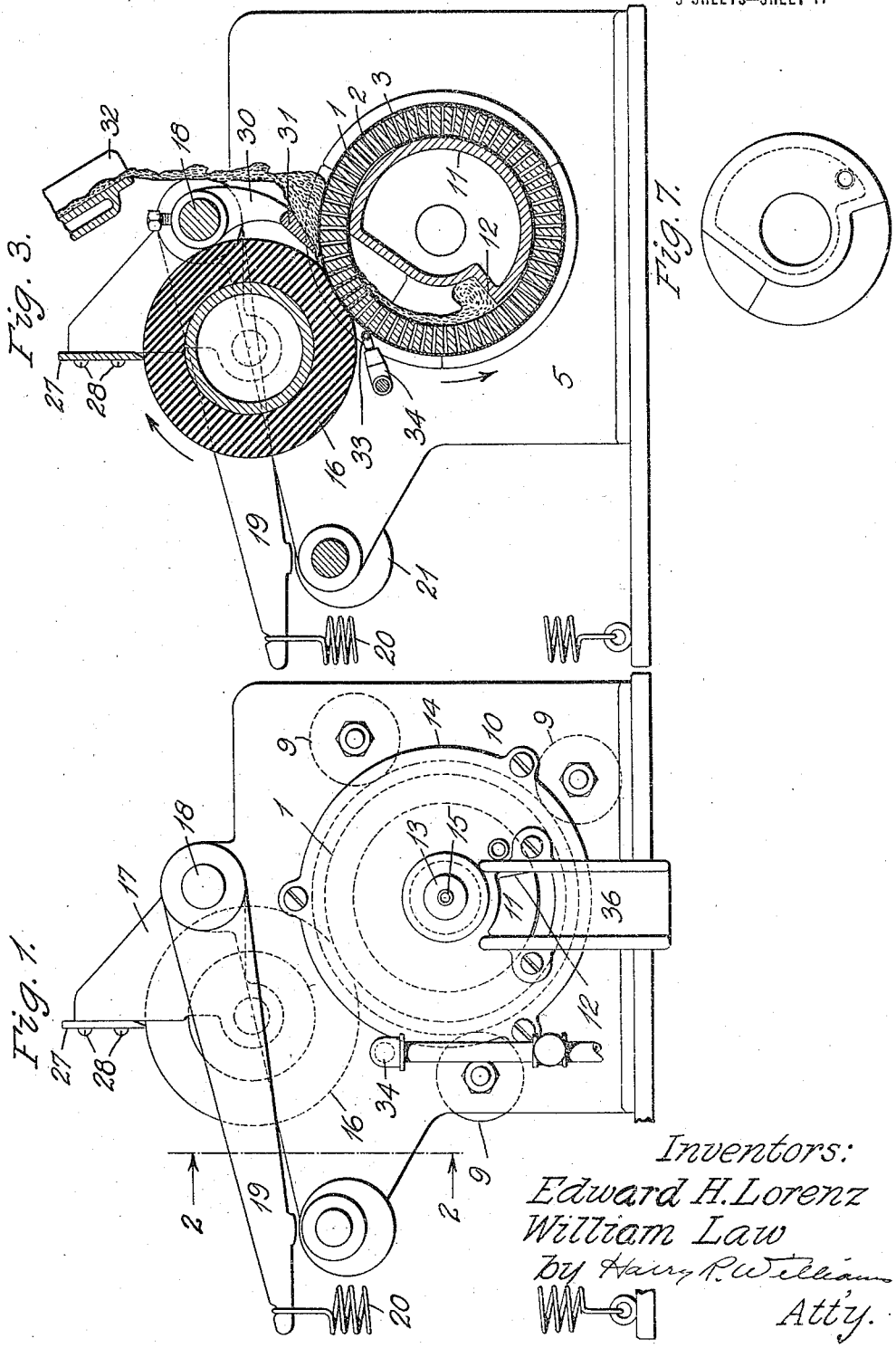

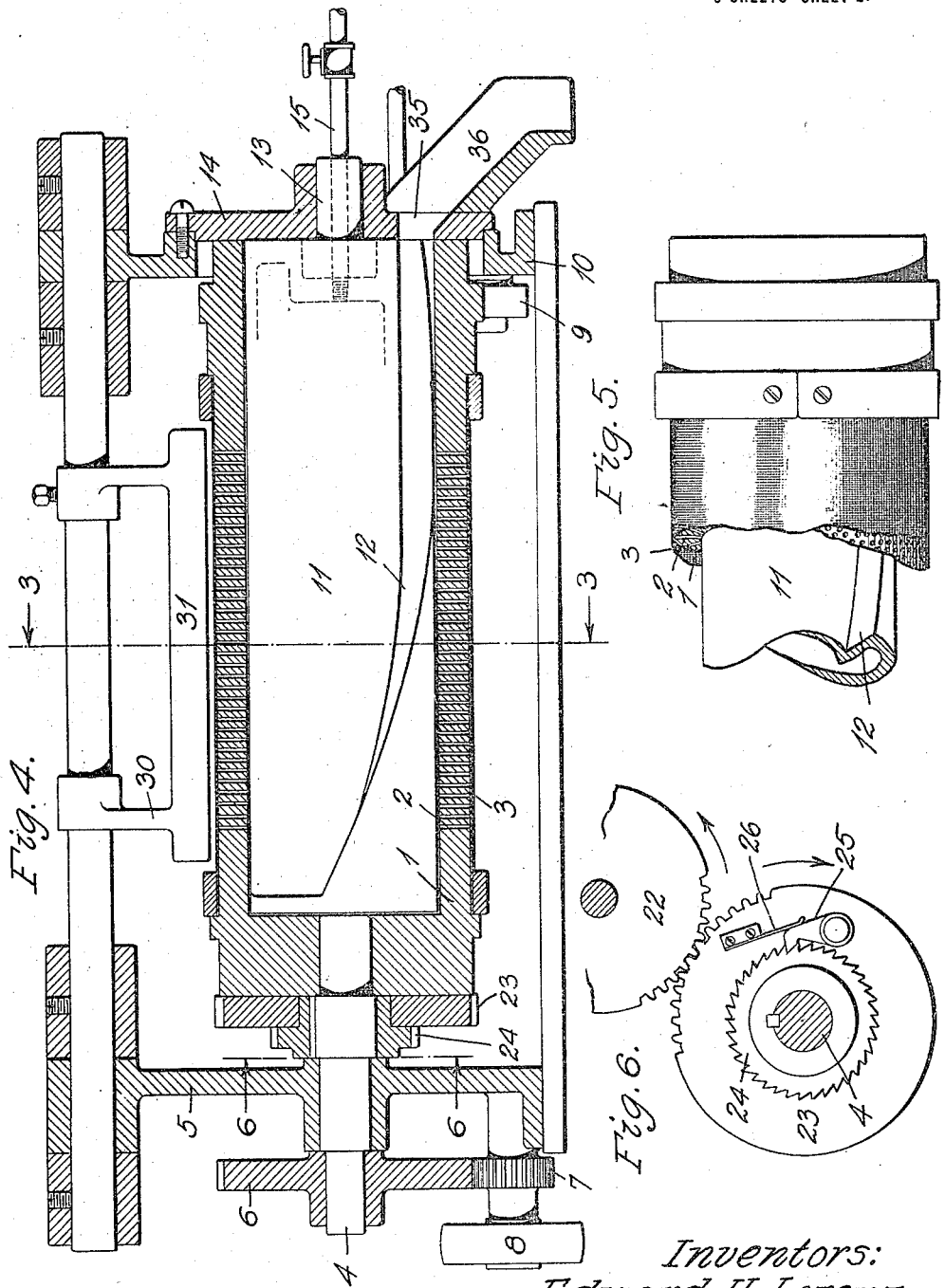

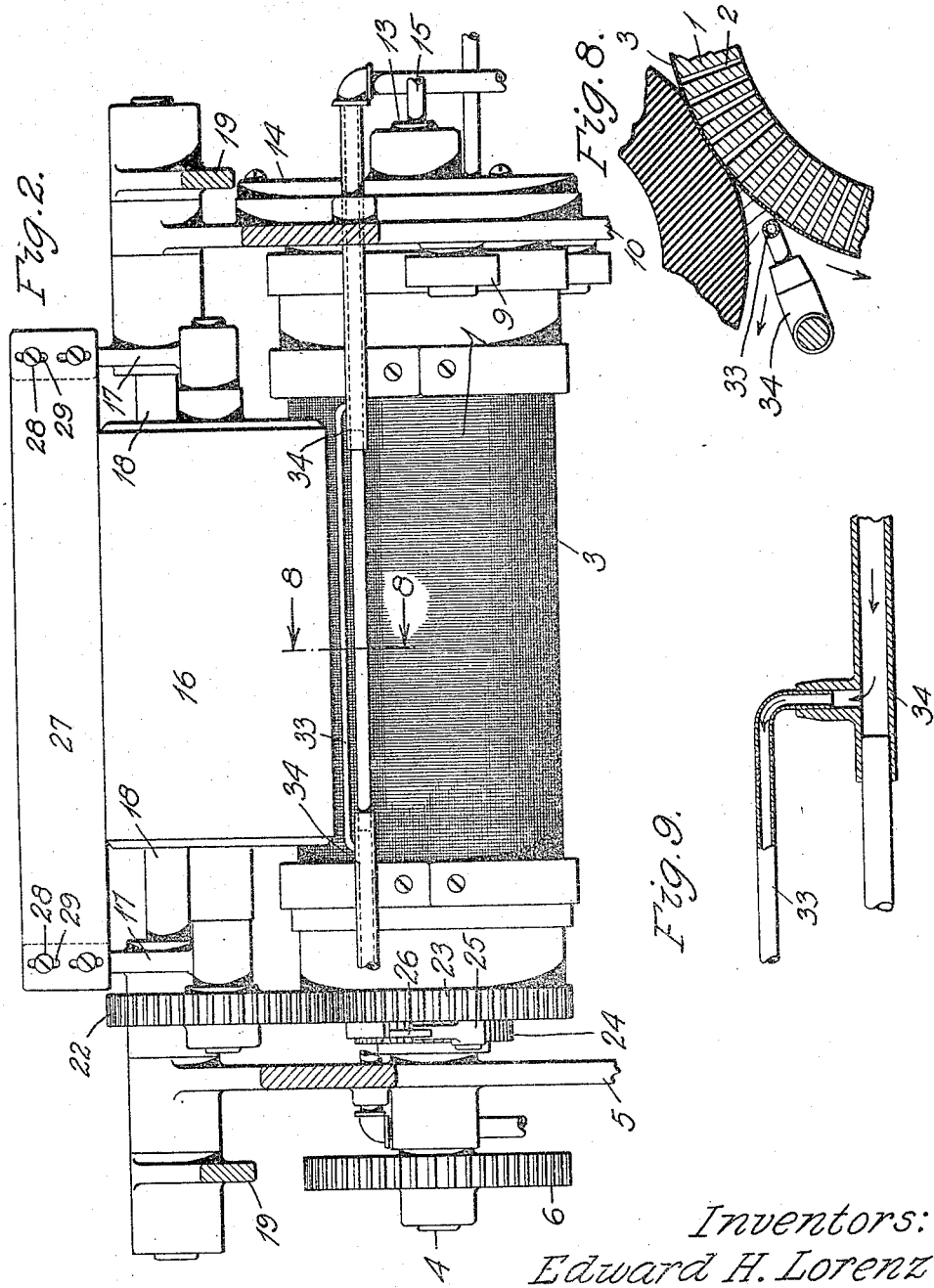

EDWARD H. LORENZ AND WILLIAM LAW, OF HARTFORD, CONNECTICUT, ASSIGNORS OF SIX-NINTHS TO BEECH-NUT PACKING COMPANY, OF CANAJOHARIE, NEW YORK, A CORPORATION OF NEW YORK, AND TWO-NINTHS TO WILLIAM A. LORENZ AND ONE-NINTH TO KARL E. PEILER, BOTH OF HARTFORD, CONNECTICUT.

GUM-STRAINING MACHINE.

1,296,096.  Specification of Letters Patent.  Patented Mar. 4, 1919.

Application filed September 8, 1916. Serial No. 119,050.

*To all whom it may concern:*

Be it known that we, EDWARD H. LORENZ and WILLIAM LAW, citizens of the United States, residing at Hartford, in the county of Hartford and State of Connecticut, have invented a new and useful Improvement in Gum-Straining Machines, of which the following is a specification.

This invention relates to the construction of a machine for straining gum in which the gum is forced through the heated and perforated walls of a straining cylinder by a roller having a yielding surface that is relatively cooler than the cylinder surface, and that as a result picks out the foreign particles from the molten gum.

The object of the invention is to provide a control for the gum fed to a machine of this character which will enable the roller to perform its function with a minimum amount of pressure and thus eliminate the possibility of forcing small particles of impurities with the gum through the straining cylinder; to provide means which prevents the drawing of large quantities of gum from the cylinder onto the roller and thus eliminate the possibility of such an accumulation of gum on the roller as would seriously interfere with the efficient operation of the machine; and to provide a driving mechanism which, while acting positively, compensates for any variation of the diameter of the roller due to wear and the pressure of the roller with its elastic surface upon the cylinder.

This invention is particularly applicable to machines provided for the treatment of chicle which is being prepared for chewing gum. Chicle in its raw commercial state contains more or less bark and other undesirable substances, and is generally melted in order to free such objectionable matter and permit its extraction. Chicle, however, cannot be heated for this purpose so hot as to reduce it to a perfect liquid, as the heat necessary to accomplish this would destroy the valuable qualities of the gum. The gum, therefore, must be treated at as low a degree of temperature as possible or in a semi-fluid or viscous state.

Figure 1 of the accompanying drawings shows a side elevation of a machine that embodies the features of this invention, which is designed to treat chicle during its preparation for chewing gum. Fig. 2 shows a rear elevation of the machine. Fig. 3 shows a vertical section on the plane indicated by the dotted line 3—3 on Fig. 4. Fig. 4 is a vertical section taken through the cylinder. Fig. 5 shows a portion of the cylinder and the interior scraper. Fig. 6 shows the intermeshing, cylinder and roller gears and the driving ratchet and pawl. Fig. 7 shows an end view of the cylinder scraper. Fig. 8 shows an enlarged section of portions of the cylinder and roller and the breaker which prevents the accumulation of gum on the roller. Fig. 9 is an enlarged section of a portion of the breaker.

The straining cylinder 1 has one end closed and the other end open. The peripheral wall of this cylinder is perforated with small holes 2 and is covered on the outside with a screen 3 of very fine mesh. At the closed end of the cylinder is a shaft 4 that is mounted in bearings supported by one of the side walls 5 of the frame, and on this shaft is a gear 6 that is engaged by the pinion 7 which is connected with the driving pulley 8. At the open end the cylinder is supported by rollers 9 mounted on the inside of the side wall 10 of the frame.

In the interior of the cylinder and held fixed is a scraper 11. This scraper is hollow and its operating edge 12, which is close to the inner wall of the cylinder, is shaped so as to extend spirally with relation to the axis of the cylinder. At the outer end the scraper has a hub 13 that is fastened in the plate 14 which is secured to the side wall 10 of the frame. Extending through this hub is a pipe 15 by means of which steam may be admitted into the scraper for keeping it hot and for warming the cylinder.

Above and designed to rest upon the cylinder is a rubber covered roller 16. The arbors of this roller are mounted in bearings in arms 17 that are fastened to the shaft 18 which is held in bearings in the side walls of the frame. Fastened to and extending from the shaft 18 are levers 19. The outer ends of these levers are drawn downward by springs 20, and beneath these ends of the levers are cams 21 which are intended to be adjusted so as to exactly fix the position of the levers and consequently determine the amount of pressure of the roller against the cylinder. This means also allows the roller to yield should any large hard substance attempt to pass between the cylinder and the roller and thus prevent injury to the mechanism. On one of the arbors of the roller is a gear 22, meshing with which is a gear 23 that is loose on the hub of the ratchet wheel 24 which is keyed to the cylinder shaft 4. Pivoted on the outer face of the gear 23 is a pawl 25 that is by a spring 26 held in engagement with the teeth of the ratchet wheel 24.

The surface speed of the roller where it engages with the cylinder should be substantially the same as the surface speed of the cylinder, otherwise the screen would soon grind away the rubber and would become clogged and fail to properly perform its function. With the gear for the roller having a pitch line of substantially the same radius as the radius of the rubber roller, where it is compressed against the cylinder and is flattened, this is accomplished regardless of the different conditions of the roller due to wear and variations of pressure by means of the described ratchet and pawl mechanism, for with this mechanism the roller will not run faster than the cylinder, and if it tends to run slower or to stop the ratchet wheel through the pawl will drive it on.

Above the rubber roller is a scraper 27. This scraper is fastened to the edges of the arms 17 by screws 28 that pass through slots 29 in the scraper into the arms so that the active edge of the scraper may be readily adjusted with relation to the surface of the rubber roller.

Adjustably fastened to the shaft 18 are arms 30 which support the feed gage plate 31. This gage is adjusted with relation to the cylinder so as to make the opening between its edge and the cylinder of such height that the melted chicle which flows from the spout 32 onto the cylinder will be held back and only the exact desired amount pass under the gage and be carried between the cylinder and roller. By reason of this less pressure may be exerted by the roller, and as a result the straining may be done more rapidly with less liability of fine particles of impurities being forced through the screen into the cylinder.

In practice it has been found that the roller being comparatively cold will draw from the warmer cylinder along its entire length, back of the heating line of the cylinder and roller, fine threads of gum that would accumulate on the roller and interfere with the efficient action of the machine unless removed. To obviate this and prevent the accumulation of gum on the roller a breaker bar 33 is arranged between and close to the surfaces of the roller and cylinder back of the line of their engagement. This breaker bar is shown as tubular and as supported at its ends by a tubular frame 34 so that steam may be admitted for keeping the bar hot. As the strings of gum are drawn up they come in contact with the hot bar and are melted, the melted gum accumulating on the bar, and when a sufficient amount of gum has gathered it drops therefrom onto the cylinder and is carried around and unites with the gum being fed from the spout to the cylinder in front of the feed gage.

In the operation of this machine the melted chicle containing foreign matter flows in a continuous viscous stream from the spout down onto the screened surface of the rotating cylinder, and just the right amount is carried under the feed gage and between the cylinder and the roller for efficient action. The pressure of the roller squeezes the gum through the screen and perforations into the interior of the cylinder. From the interior of the cylinder this clear gum is gathered by the spiral scraper and caused to flow out of the open end of the cylinder through the hole 35 in the plate 14 to the discharge spout 36, the cylinder and the interior scraper being heated to the required degree to facilitate this flow of the gum. The impurities in the gum are not forced through the screen into the cylinder, but are picked up by the comparatively cold yielding surface of the roller and carried thereby until they are collected by the scraper at the top of the roller from which locality they are gathered from time to time. The driving mechanism for the roller compensates for variations in the diameter of the roller, owing to differences in the pressure of the roller against the cylinder and to the wear of the roller, so that the surface speed of the roller and the cylinder along the line of their contact is always substantially the same. The feed gage is adjusted to regulate the feed of gum to the cylinder so as to obtain the greatest efficiency, and the breaker bar by melting the drawn out threads prevents the accumulation of gum on the roller.

The invention claimed is:

1. In a machine for straining molten gum having a rotatory perforated screen-covered hollow cylinder, mechanism for rotating the cylinder, means for heating said cylinder and keeping the gum molten, a roller with an elastic surface bearing upon said cylinder for picking the solid impurities from the gum and forcing the purified gum through the screen and perforations of the cylinder, mechanism for rotating the roller, and an adjustable gage extending toward the opening between the cylinder and roller for regulating the flow of gum therethrough.

2. A machine for straining gum having a rotatory perforated screen covered hollow cylinder, mechanism for rotating the cylinder, means for heating the cylinder, a roller with an elastic surface bearing upon the cylinder, and mechanism for rotating the roller, said mechanism including a ratchet and pawl arranged to drive the roller positively, yet allow the roller to rotate independently faster than the driving mechanism.

3. A machine for straining gum having a rotatory perforated screen covered hollow cylinder, mechanism for rotating the cylinder, means for heating the cylinder, a roller bearing upon the cylinder, and a heated bar between the cylinder and the roller back of the line of their contact for preventing the drawing of gum from the cylinder to the roller.

4. A machine for straining molten gum having a rotatory perforated screen-covered hollow cylinder, mechanism for rotating the cylinder, a scraper inside of and bearing against the inner wall of said cylinder for removing the molten gum therefrom, means for heating the scraper and keeping the gum molten, a roller with an elastic surface bearing upon the cylinder for picking the solid impurities from the gum and forcing the purified gum through the screen and perforations of the cylinder, mechanism for rotating the roller, and an adjustable gage extending toward the opening between said cylinder and roller for regulating the flow of gum therethrough.

5. A machine for straining molten gum having a rotatory perforated screen-covered hollow cylinder, mechanism for rotating the cylinder, means for heating said cylinder and keeping the gum molten, a roller with an elastic surface bearing upon said cylinder for picking the solid impurities from the gum and forcing the purified gum through the screen and perforations of the cylinder, mechanism for rotating the roller, an adjustable scraper adjacent to the surface of the roller for removing the impurities therefrom, and an adjustable gage extending toward the opening between the cylinder and roller for regulating the flow of gum therethrough.

6. A machine for straining molten gum having a rotatory perforated screen-covered hollow cylinder, mechanism for rotating the cylinder, a scraper inside of and bearing against the inner surface of said cylinder for removing the molten gum therefrom, mechanism for heating the scraper and keeping the gum molten, a roller with an elastic surface bearing upon the cylinder for picking the solid impurities from the gum and forcing the purified gum through the screen and perforations of the cylinder, mechanism for rotating the roller, an adjustable scraper adjacent to the surface of the roller for removing the impurities therefrom, and an adjustable gage extending toward the opening between said cylinder and roller for regulating the flow of gum therethrough.

7. A machine for straining gum having a rotatory perforated screen covered hollow cylinder, a roller with an elastic surface bearing upon the cylinder, mechanism for rotating the cylinder, and a ratchet and pawl mechanism between the cylinder rotating mechanism and the roller for positively driving the roller.

8. A machine for straining molten gum having a rotatory perforated screen-covered hollow cylinder, means for heating the cylinder, a roller with an elastic surface bearing upon the cylinder for picking the solid impurities from the gum and forcing the purified gum through the screen and perforations of the cylinder, gears for rotating the roller, and a ratchet and pawl connection intermediate the cylinder rotating gears and the roller rotating gears for positively rotating the latter gears.

9. A machine for straining gum having a rotatory perforated screen covered hollow cylinder, mechanism for rotating the cylinder, means for heating the cylinder, a roller bearing upon the surface of the cylinder, mechanism for rotating the roller, and a heated bar between the cylinder and the roller back of the line of their contact for preventing the pulling of gum from the cylinder to the roller.

10. A machine for straining gum having a rotatory perforated screen covered hollow cylinder, mechanism for rotating the cylinder, means for heating the cylinder, a roller bearing upon the surface of the cylinder, a tubular bar arranged between the cylinder and the roller back of the line of their contact, and means for heating said bar.

EDWARD H. LORENZ.
WILLIAM LAW.